(12) United States Patent
Hottinen

(10) Patent No.: US 7,623,590 B2
(45) Date of Patent: *Nov. 24, 2009

(54) DIVERSITY TRANSMITTER AND DIVERSITY TRANSMISSION METHOD

(75) Inventor: Ari Hottinen, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/619,588

(22) Filed: Jan. 3, 2007

(65) Prior Publication Data

US 2007/0189409 A1    Aug. 16, 2007

Related U.S. Application Data

(63) Continuation of application No. 10/398,581, filed as application No. PCT/EP01/09231 on Aug. 9, 2001, now Pat. No. 7,158,579.

(51) Int. Cl.
*H04B 7/02* (2006.01)
(52) U.S. Cl. .................................... 375/267
(58) Field of Classification Search ................. 375/260, 375/267, 299, 347; 455/101, 506
See application file for complete search history.

(56) References Cited

U.S. PATENT DOCUMENTS

| | | | |
|---|---|---|---|
| 6,157,612 A | | 12/2000 | Weerackody et al. |
| 6,594,473 B1 * | | 7/2003 | Dabak et al. ............... 455/101 |
| 6,661,856 B1 * | | 12/2003 | Calderbank et al. ......... 375/347 |
| 2003/0227979 A1 * | | 12/2003 | Tirkkonen .................. 375/267 |
| 2005/0063483 A1 * | | 3/2005 | Wang et al. ................. 375/267 |

FOREIGN PATENT DOCUMENTS

| | | |
|---|---|---|
| EP | 1063790 | 12/2000 |
| WO | 01056218 | 8/2001 |

OTHER PUBLICATIONS

3rd Generation Partnership Project, "Technical Specification Group Radio Access Network; Physical layer procedures (FDD) (Release 4)," 3GPP 25.214 v4.0.0 (2000).

(Continued)

*Primary Examiner*—Don N Vo
(74) *Attorney, Agent, or Firm*—Kenneth K. Vu; Stanton Braden

(57) ABSTRACT

The present invention concerns a diversity transmitter, comprising: transmit symbol input means (1) for inputting a symbol matrix (b) to be forwarded to a transmit processing means (2), said transmit processing means comprising supplying means (2*a*) for supplying columns of said symbol to a plurality of at least two branches, each branch being supplied to a respective one of spatial channels (A1, . . . , Am) for transmission to a receiver, a parallelization means (2*b*) adapted to provide within each branch at least two parallel channels allocated to a respective user, and weighting means (2*c*) adapted to subject the symbol signals on at least one of said branches to an invertible linear transformation with a fixed complex weight, the complex weight being different for at least two parallel channels. The present invention also concerns a corresponding diversity transmission method.

30 Claims, 2 Drawing Sheets

OTHER PUBLICATIONS

3GPP2 C.P9010 version 0.21, "Draft Baseline Text for the Physical Layer Portion of the 1xEV Specification," 3GPP2 TSG-C Working Group III, Qualcomm Incorporated (Aug. 24, 2000).

Hottinen et al., "A Randomization Technique for Non-Orthogonal Space-Time Block Codes," IEEE, Finland (2001).

Hottinen et al., "A Space-Time Coding concept for a Multi-Element Transmitter," Nokia Research Center, Finland.

New CPICH Transmission scheme for 4-antenna transmit diversity, TSG-RAN Working Group 1 meeting #15, TSGR1#15(00)1072, Samsung Electronics Co., Ltd., Germany (Aug. 2000).

Sayeed, Z. et al., "Transmit Diversity for Coded OFDM Systems in Single Frequency Networks," Global Telecommunications Conference - Globecom '99.

Kaiser, S.: "Spatial Transmit Diversity Techniques for Broadband OFDM Systems," Institute of Communications and Navigation, Germany.

Tirkkonen et al, "Complex Space-Time Block Codes for Four Tx Antennas," Nokia Research Center, Finland.

International Search Report - PCT/EP01/009231, International Search Authority - European Patent Office, Jun. 5, 2002.

* cited by examiner

DIVERSITY TRANSMITTER AND DIVERSITY TRANSMISSION METHOD

This application is a continuation of U.S. application Ser. No. 10/398,581, filed Apr. 8, 2003, now U.S. Pat. No. 7,158,579 issued Jan. 2, 2007, which is a U.S. National Stage application claiming priority to International Application No. PCT/EP01/09231, filed Aug. 9, 2001, both of which are incorporated herein by reference.

FIELD OF THE INVENTION

The present invention relates to diversity transmitters, and in particular to diversity transmitters for use in connection with mobile communication systems such as UMTS and the like. Also, the present invention relates to a corresponding diversity transmission method.

BACKGROUND OF THE INVENTION

In connection with diversity transmitters, different concepts are being discussed. In general, so called open-loop concepts and closed-loop concepts can be distinguished, as it is for example outlined in the document "A Randomization Technique for Non-Orthogonal Space-Time Block Codes" by the present inventor and his co-author, presented on IEEE Vehicular Technology Conference, May 2001, Rhodes, Greece.

A number of different such open-loop concepts have been proposed in $3^{rd}$ generation partnership project 3GPP (and/or 3GPP2). For example, in the above mentioned document "A Randomization Technique for Non-Orthogonal Space-Time Block Codes" Applicants have presented the so called ABBA concept in 3GPP2. Motorola has proposed a combination of STTD+OTD (Space-Time Transmit Diversity+Orthogonal Transmit Diversity), and recently in the TSG-RAN Working Group 1 meeting #15 in Berlin, Germany, Aug. 22-Aug. 25, 2000, Samsung proposed a 2xSTTD concept in the submitted document "New CPICH Transmission Scheme for 4-antenna transmit diversity".

In the document "A Space-Time Coding Concept for a Multi-Element Transmitter", by the present inventor and his co-authors, presented in the Canadian Workshop on Information Theory, June 2001, Vancouver, Canada, Applicants proposed a so-called Trombi-concept. (US-patent application filed on Mar. 28, 2001). Nokia's Trombi concept (to be explained later in some greater detail) is considered by the inventor to show currently the best performance. However, up to now the Trombi-concept was mainly implemented in connection with phase-hopping or phase sweeping arrangements. Phase-hopping and phase sweeping can be used also in the context of the present invention, but with the Trombi-method the transmission methods involving very high data rates in WCDMA downlink can be further enhanced.

Further transmit diversity concepts have been considered in the OFDM literature (orthogonal frequency division multiplexing). For example, such concepts are discussed in the document "Spatial Transmit diversity techniques for broadband OFDM systems" by S. Kaiser, published in IEEE, 2000, page 1824-1828, (0-7803-6451-1/00).

This proposed concept by Kaiser however requires interleaving over multiple frequencies for full benefit. (A similar approach being discussed in U.S. Pat. No. 6,157,612). Moreover, according to the teaching of Kaiser, a symbol to be transmitted is distributed across several carriers, so that for combining the received multipath components, guard intervals are required in order to be able to correctly combine the transmitted (distributed) symbol parts at the receiving side Referring back to the above mentioned so-called Trombi concept the following was proposed. A time-varying/hopping phase (e.g. pseudo-random) is added to the dedicated channel of a given user at the output of STTD encoder (Space-Time Transmit Diversity) (or an encoder based on some other orthogonal or non-orthogonal concept, see e.g. the previous "Randomization technique . . . " paper).

In one solution with 4 antennas, antennas 2 and 4 are multiplied by a complex coefficient (constant for two space-time coded [successive] symbols) to result in the following received signal (note that the received signal r, the symbols S, the transmission channel transfer functions h and complex coefficients w are generally given in matrix notation)

$$r_{t1}=S_1(h_1+w_1(t)h_2)-S_2^*(h_3+w_2(t)h_4)$$
$$r_{t2}=S_2(h_1+w_1(t)h_2)+S_1^*(h_3+w_2(t)h_4) \quad (1)$$

In a preferred arrangement, it is configured such that $w1(t)=-w2(t)$, with constant amplitude=1. Phase changes according to a suitable pseudo-random sequence. For example, it can hop with phases 0, 180, 90, −90, (or with any other sequence) known [a priori] to the terminal (receiver). 8-PSK hopping appears to be sufficient to get achievable gains.

Then, the terminal estimates the channels h1, . . . , h4, for example using common channel pilots (or dedicated pilots) which do not need to apply phase dynamics (e.g. common channel measurements can be done as proposed by Samsung in the cited document). Alternatively, the terminal can measure the effective channels h1+w*h2 and h3−w*h4 only.

By knowing the channels and the pseudo-random weights at the transmitter the intentional phase dynamics can be taken into account and then the detection reduces to conventional STTD decoding without any complexity increase.

In essence, the dynamics of the phase-hopping should be a priori fixed or at least it should be known by the UE (e.g. by suitable signaling from the transmitter to the receiver). In some cases it may also be advantageous if the UE controls the phase-hopping sequence. As such a control procedure is expected to be known to those skilled in the art, these details are supposed to be not needed to be explained here.

With channel coding, providing time diversity, the concept has better performance in low Doppler channels than a two antenna STTD concept, as shown in the "Trombi paper". Phase-hopping diversity can be used also in a way such that the channel estimates are directly taken from a phase-hopping channel. In that case the hopping sequence can have only incremental changes, as otherwise the effective channel is changing too rapidly to enable efficient channel estimation. However, in this case the receiver terminal (User Equipment UE in UMTS) does not necessarily need to know that phase-hopping is used at all.

Therefore, in the aforementioned scheme, phase-hopping can weaken channel estimation performance by the abrupt phase hops, or the hops have to be quantized to many levels, to thereby approximate a phase-sweep.

The Trombi concept is designed for sequential transmission, and the phase-hopping sequence is defined over multiple time instants, covering multiple space-time encoded blocks. In future communication systems the whole information frame may be transmitted in one or a few symbol intervals (e.g. if in a CDMA system essentially all downlink codes are allocated to one user at a time). In such an extreme case, only one or a few phase-hopping values can be incorporated to the transmission, and the benefits of the Trombi concept cannot be achieved.

As an example, in "Draft Baseline Text for Physical Layer Portion of the 1xEV Specification" 3GPP2 C.P9091 ver. 0.21, Aug. 24, 2000 (3GPP2 TSG-C working group III) the physical layer of the High Data Rate CDMA system is described. This system uses Time Division Multiplexing in downlink and each user can be allocated only one slot, and the pilots are structured so that only one channel estimate can be obtained for this one slot.

SUMMARY OF THE INVENTION

Hence, it is an object of the present invention to provide an improved diversity transmitter and diversity transmission method which is free from the above mentioned drawbacks.

According to the present invention, this object is for example achieved by a diversity transmitter, comprising: transmit symbol input means for inputting a symbol matrix to be forwarded to a transmit processing means, said transmit processing means comprising supplying means for supplying columns of said symbol matrix to a plurality of at least two branches, each branch being supplied to a respective one of spatial channels for transmission to a receiver, a parallelization means adapted to provide within each branch at least two parallel channels allocated to a respective user, and weighting means adapted to subject the symbol matrix signals on at least one of said branches to an invertible linear transformation with at least one fixed complex weight, the complex weight being different for at least two parallel channels.

According to the present invention, this object is for example also achieved by a diversity transmission method, comprising the steps of inputting a symbol matrix for being processed, said processing comprising supplying columns of said symbol matrix to a plurality of at least two branches, each branch being supplied to a respective one of spatial channels for transmission, performing parallelization so as to provide within each branch at least two parallel channels allocated to a respective user, and subjecting the symbol matrix signals on at least one of said branches to an invertible linear transformation with at least one fixed complex weight, the complex weight being different for at least two parallel channels.

According to further refinements of the present invention (method as well as transmitter),
said invertible linear transformation is a unitary transformation,
said unitary transformation is represented by a unitary weight matrix in which at least two elements have different non-zero complex phase values,
said parallelization means/step is adapted to perform multicode transmission using multiple spreading codes,
multicode transmission is performed using a Hadamard transformation by multiplying the symbols with a spreading code matrix H,
said spreading code matrix is antenna specific,
said spreading codes are non-orthogonal spreading codes,
said spreading codes are orthogonal spreading codes,
said fixed complex weights applied by said weighting means/step are time-invariant phase shift amounts for the respective parallel channels,
the phase shift amounts are independent of the channels in at least two corresponding parallel channels transmitted out of different antennas,
the phase shift amounts are dependent on the channels,
said weighting matrix is identical for each branch,
said weighting matrix differs for each branch.
there is provided a pre-diversification step/means performed after/arranged downstream inputting and performed before/arranged upstream processing, said pre-diversification step/means subjecting said inputted symbol sequence to a diversification, at least one diversified symbol sequence being subjected to said processing,
said pre-diversification step/means subjects said input symbol sequence to at least one of an orthogonal transmit diversity OTD, orthogonal space-time transmit diversity STTD processing, a non-orthogonal space-time transmit diversity STTD processing, delay diversity DD processing, Space-Time Trellis-Code processing, or Space-Time Turbo-Code processing,
said input symbol sequence is a channel coded sequence,
said channel coding is Turbo coding, convolutional coding, block coding, or Trellis coding,
said pre-diversification step/means subjects said input symbol to more than one of said processings, said processings being performed in concatenation,
said phase offsets in parallel channels differ by a fixed amount,
said phase offsets in parallel channels differ by a maximum possible amount,
said phase offsets in parallel channels cover a full complex circle of 360°,
said phase offsets in parallel channels are taken from a Phase Shift Keying configuration,
said used phase offsets are signaled to the receiver,
said phase offsets are at least partially controlled by the receiver via a feedback channel,
all columns of the symbol matrix contain the same symbols,
said symbol matrix is an orthogonal space-time block code,
said symbol matrix is a non-orthogonal space-time block code,
at least one column of the symbol matrix is different from another column,
said symbol matrix contains at least two space-time code matrices, each modulating different symbols,
all columns of the symbol matrix have different symbols,
each parallel channel transmits from respective spatial channel in parallel at least two symbols allocated to the spatial channel.

Still further, for example, said spreading codes are scrambeled with a transmission unit specific scrambling sequence (e.g. same for all antennas in one base station or transmission unit), said weighting means applies a complex weighting matrix [having in its diagonal the time-invariant phase shift amounts] for the respective symbol sequences, said symbol sequences modulating the respective parallel channels.

Also, for example, said pre-diversification means/step subjects said input symbol to at least one of an orthogonal transmit diversity OTD processing, parallel transmission (in this case pre-diversification takes as an input e.g. 4 different symbols, performs serial to parallel conversion and transmits the 2 symbols in parallel simultaneously from two antennas or branches, this increasing the data rate by factor of two), orthogonal space-time transmit diversity (STTD, assuming arbitrary number of outputs), a non-orthogonal space-time transmit diversity STTD processing (maintaining the rate at 1 or increase the rate beyond 1, but allowing some self-interference), delay diversity DD processing, Trellis-Code processing, Convolutional Code Processing or Turbo-Code processing, said pre-diversification means subjects said input symbol to more than one of said processings, said processings being performed in concatenation. So, there exists a system in which there is first channel coding, e.g. by a Turbo/Convolutional code, the output is given to OTD, S/P, STTD or NO-STTD, and there is typically interleaving after Turbo coding.

Thus, by virtue of the present invention the above mentioned drawbacks inherent to known prior art arrangements are removed.

In particular, the following advantages can be achieved:
improvement of performance with burst transmission,
no interference with channel estimation,
simple to implement at the transmitter, as no semi-continuous sweep is required,
no interleaving over multiple frequencies is required for full benefit,
no guard intervals are required in order to be able to correctly combine the transmitted (distributed) symbol parts at the receiving side.

In particular, one embodiment of the present invention achieves to obtain similar effective received channels (eq. 1, defined over time) even without making use of phase-hopping, and even if the transmission interval is very short and highly parallel burst transmission is used. In another embodiment the invention achieves to randomize the correlations within a non-orthogonal space-time code even if the transmission interval is very short.

BRIEF DESCRIPTION OF THE DRAWINGS

In the following, the present invention will be described in greater detail with reference to the accompanying drawings, in which.

DETAILED DESCRIPTION OF THE EMBODIMENTS

In the diversity transmitter and method according to the present invention there are multiple parallel transmissions out of at least two spatial channels (which may be antennas or beams). Namely, basically there need to be at least two (logical) parallel channels (e.g. spreading codes) allocated to a given user (receiver), the parallel channels are transmitted out of at least two spatial channels such as transmit antennas (or beams), e.g. like in Trombi, at least two (preferably 8, according to Trombi results) of the parallel channels, transmitted out of at least one of said spatial channel (antenna) are weighted by multiplication with a fixed complex weight, the complex weight being different for at least two parallel channels.

This will be explained in greater detail with reference to FIG. 1.

Figure 1:
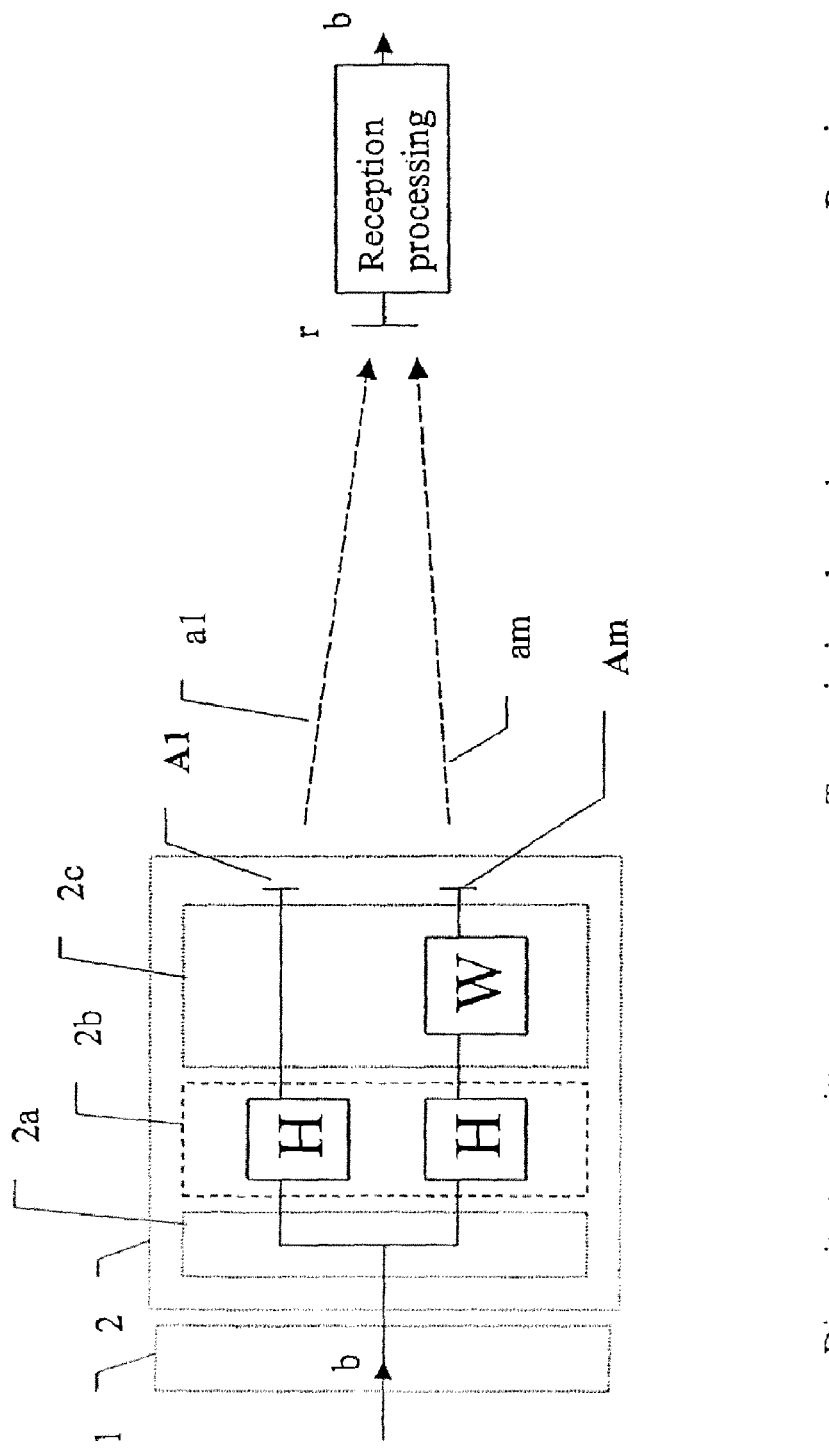
FIG. 1 shows a simplified block diagram of a basic configuration of a diversity transmitter according to the present invention and operating according to the basic diversity transmission method according to the present invention.

FIG. 1 shows a diversity transmitter, i.e. a simplified block diagram of a basic configuration of a diversity transmitter according to the present invention. Transmissions out of antennas (representing an example of spatial channels) A1, ..., Am are experiencing the influence of respective transmission channels a1, ..., am before reception at a receiver. In general, a symbol b to be transmitted is processed at the transmitter, transmitted via the transmission channel(s) and received at the receiver, where it is subjected to a reception processing in order to reconstruct the initially transmitted symbol b. Reception processing involves channel estimation in order to compensate for the influence of the transmission channels. (Note that the symbol b as well as the transmission channels, i.e. channel impulse response a thereof, are in matrix notation).

The diversity transmitter comprises a transmit symbol input means 1 for inputting the symbol b (symbol matrix or a sequence of symbol matrices) to be forwarded to a transmit processing means 2. The transmit processing means 2 in turn comprises supplying means 2a for supplying said symbol b to a plurality of at least two branches, each branch being supplied to a respective one of transmit antennas A1, ..., Am (i.e. spatial transmit channels) for transmission to a receiver. A parallelization means 2b is adapted to provide within each branch at least two parallel channels allocated to a respective user (i.e. receiver), and a weighting means 2c is adapted to multiply the symbol signals on at least one of said branches with a fixed complex weight, the complex weight being different for at least two parallel channels.

In FIG. 1, the parallelization is performed in each of the shown two branches, while the weighting is effected only in the lower branch. Nevertheless, it may be performed in the upper branch instead of the lower branch or in both branches.

The parallelization means 2b is adapted to perform a multicode transmission WCDMA such as for example Hadamard transformation by multiplying with a user and/or service specific spreading code matrix H, and the spreading code matrix may be antenna specific. In the illustrated example, however, the same spreading code matrix has been selected for each antenna or spatial channel. If a Hadamard transformation is applied for spreading, scrambling prior to outputting the processed symbols to the antennas is performed, while however, such scrambling and RF processing is omitted from the illustration for purposes of keeping the illustration simple.

The received signal r at the receiver after multipath propagation over the channels a1, a2 (am with m=2) is then $$r = a_1 H b + a_2 H \text{diag}([\exp(j\phi_1), \ldots, \exp(j\phi_n)]) b + n \quad (2)$$

where the diagonal matrix "diag" consists of the fixed complex weights of a weighting matrix W, and coefficients a1, a2 refer to channel coefficients (i.e. the respective channel impulse response) between a given antenna and the terminal H is the matrix of spreading codes, n represents a noise component, and b the vector/matrix of transmitted symbols This basic embodiment may be concatenated with pre-diversification performed by a pre-diversification means 3 arranged downstream said input means 1 and upstream said transmit processing means 2.

Figure 2:
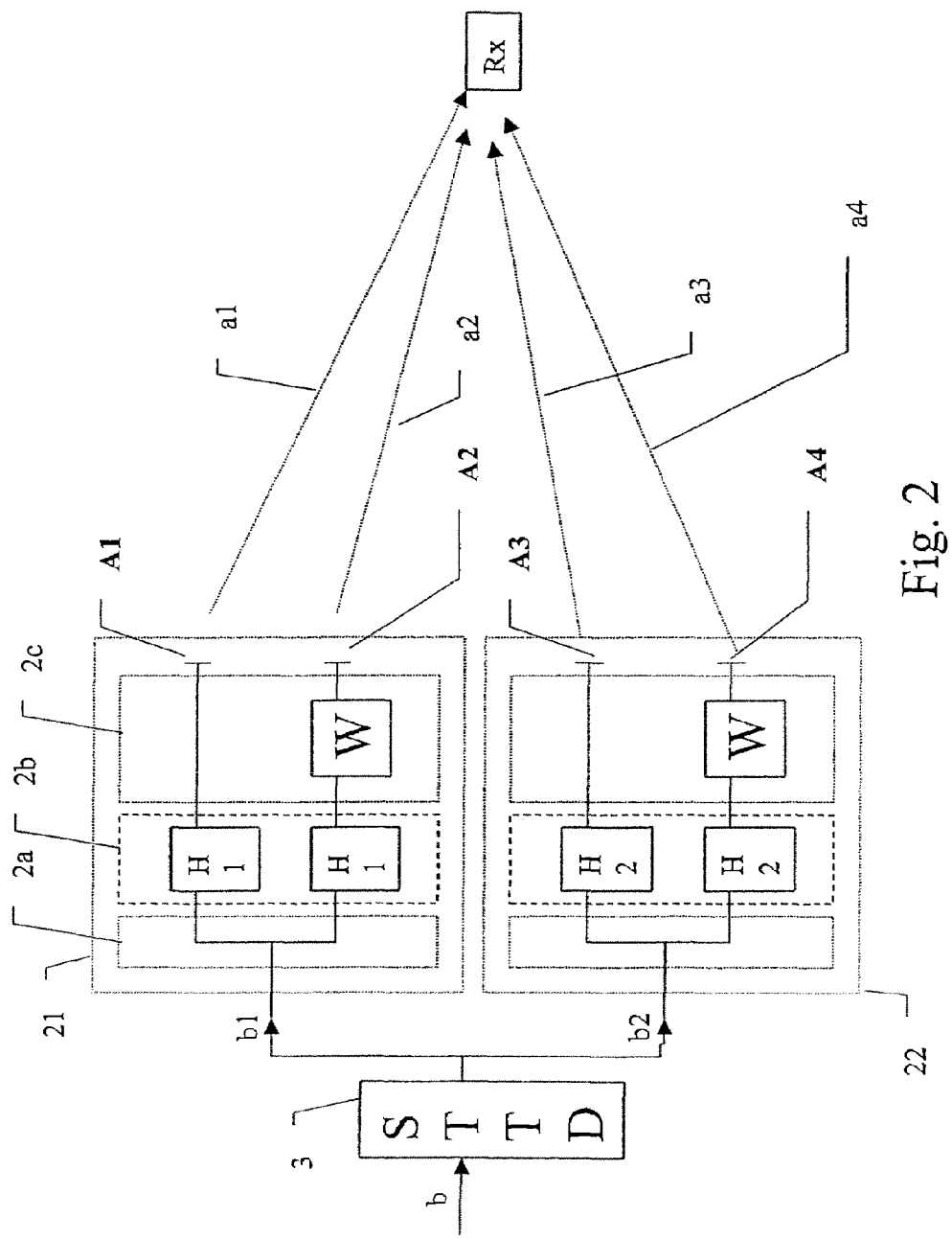
FIG. 2 shows a modification a simplified block diagram of a modified configuration of a diversity transmitter according to the present invention, including a pre-diversification means.

FIG. 2 shows an example of such a diversity transmitter, with the input means being omitted from the figure. The pre-diversification means 3, for example performing STTD or another diversity concept, is adapted to subject said inputted symbol matrix b to a diversification, each diversified symbol (vectors/sequences) b1, b2 being supplied to said processing means. As shown in the example in FIG. 2, a first diversified signal b1 is supplied to a processing means 21, while a second diversified signal b2 is supplied to a processing means 22. Means 21 and 22 are illustrated as being identical to each other, while this is not required to be. They may differ in terms of the spreading matrix H used, the weighting matrix W used, and even in the number m of spatial channels (antennas or beams) used. In a multiuser CDMA system where at least one transmission applies said multicode transmission it is preferred that the means 21 and 22 are the same, but that different users select different codes from said spreading matrix. Then the different code-multiplexed users do not interfere with each other, if the matrix is orthogonal.

When concatenating this with other transmission diversity concepts as shown in FIG. 2, one needs to define the symbols (b) differently. In particular, we can consider a case in which we have 4 antennas, and in which two parallel transmissions (both transmitting from two antennas) are Combined with Orthogonal Transmit Diversity (OTD), such that they have the same symbol sequences, but different antenna specific orthogonal spreading matrices H1 and H2. Then one receives a signal $$r = a_1 H_1 b + a_2 H_1 \text{diag}([\exp(j\phi_1), \ldots, \exp(j\phi_n)])b + a_3 H_2 b + a_4 H_2 \text{diag}([\exp(j\phi_1), \ldots, \exp(j\phi_n)])b + n \quad (3)$$

with four subscripts 1, . . . 4 for the channels as in the example there are m=4 transmission antennas, two subscripts 1, 2, for parallel (multi)codes H1, H2 in different transmission antenna branches (due to OTD). In this case they are preferably different submatrices of a Hadamard code matrix, and thereby orthogonal to each other. n again represents a noise component.

In alternative concepts we have at least partly different symbols sequence/vectors b1 and b2 transmitted from the two different antenna pairs. Then, the received signal is given by $$r = a_1 H_1 b_1 + a_2 H_1 \text{diag}([\exp(j\phi_1), \ldots, \exp(j\phi_n)])b_1 + a_3 H_2 b_2 + a_4 H_2 \text{diag}([\exp(j\phi_1), \ldots, \exp(j\phi_n)])b_2 + n \quad (3')$$

For example, the symbol vectors b1 and b2 may represent two different information substreams (possibly after channel coding), formed with serial to parallel (S/P) conversion. Then, the transmission concept increases the data rate by a factor of two. If the spatial channels from the transmit antennas to the receive antennas are sufficiently different we can have H1=H2 and still be able to detect the symbol streams b1 and b2. In alternative embodiments, the symbol streams b1 and b2 may each belong to different branches of the STTD (or any other space-time code, including Space-time spreading). As an example, with STTD, the b1=(c1 c2) and b2=(−c2* c1*), where c1 and c2 are the (complex) symbols forwarded to parallel transmission means. In this case these symbol sequences are separable (in fact, orthogonal) due the properties of the space-time code, and the matrices H1 and H2 are preferably identical. Note that in this case the symbol rate remains at 1 since it takes two time intervals to transmit two symbols. However, the diversity order is doubled. The code matrices are preferably orthogonal, e.g. Hadamard codes, or rotated (scrambled) Hadamard codes, or nearly orthogonal, such as well known Gold codes. Any other orthogonal space-time code can be used.

It is to be noted that the antenna specific parallel channels H, H1 and H2 above can have an arbitrary spreading factor, and can be implemented in code domain (parallel codes), or with orthogonal carriers (frequencies).

This can be combined with any other transmit diversity concept, when e.g extending the number of transmit antennas further. One can concatenate delay diversity, non-orthogonal space-time codes, orthogonal space-time codes, space-time trellis codes, Turbo-coded transmit diversity and various others with the proposed concept. Also, if one does not have a sufficient number of parallel channels but a sufficient number of successive symbol intervals, one can still use phase hopping, as the prior art proposes.

The complex weights should be defined so that consecutive coded bits or symbols see a different channel. In one example, the parallel channels apply phases with 0, 180, 90, −90 degree offsets. Preferably, we would have at least eight states (e.g. from PSK alphabet), such that the phase sequence visits all states once and such that the "path length" is maximized.

One can apply the fixed phase coefficients also in analogy with the ABBA concept and/or randomized ABBA concept (RABBA) if there are at least three transmit paths, e.g. three different transmit antennas. This is then effected in the pre-diversification means 3. In this case a sequence of symbols is input to the ABBA code (e.g. as in Trombi), each output of the ABBA code (columns of the ABBA, or some other non-orthogonal space-time code matrix) are directed to different transmit antennas, and the sequence in each different branch is subjected to multicode transmission, such that at least in one branch at least one code is subjected to a fixed phase rotation. Note, that this can be implemented also so that selected symbols in a given branch of the non-orthogonal code have a rotated signal constellation.

It is assumed that there are four antennas, and that different columns of the ABBA code are transmitted out of antennas 1, . . . , 4 in parallel with different K spreading (Walsh) codes (w_k) or carriers (e.g. vectors from the IFFT matrix in OFDM). In this case the transmitted signal for a packet of 4*K (number 4 comes from the particular ABBA construction, where in this example the 2×2 matrices A and B both contain 2 symbols e.g. from QPSK alphabet, there is essentially the same symbol construction in STTD, described earlier) symbols are given by equation (4) below $$\sum_{k=1:K} \begin{bmatrix} w_k A_k & w_k \exp(j\theta_k) B_k \\ w_k B_k & w_k \exp(j\theta_k) A_k \end{bmatrix} \quad (4)$$

where matrices A and B are the elements of the so called ABBA matrix (ABBA can be replaced here by any other non-orthogonal block code, optimized for one of multiple receive antennas). Each parallel transmission, indexed by k, carries different ABBA symbol matrices, and the signals are transmitted out of antennas.

In the aforementioned example several parallel ABBA transmissions have different complex weights modulating the output of at least one antenna (in the example in previous equation, two antennas).

Thus, there is no time index in the complex phasors (phasors means the multiplication factor achieving the time-invariant phase shift). Note that the parallel Trombi-concept can be described also with eq. 4, when two (and only two) B and A matrices switch place (are exchanged).

In terms of other conceivable embodiments it is clear that a similar approach can be used for any system with more than two antennas. Also, the number of antennas need not to be an even number as in the illustrated examples in FIGS. 1 and 2, but may be arbitrary.

The parallel weighted channels can be transmitted to non-fixed beams which are defined for example by long-term feedback from the receiver or by receive measurements, or by both; or they can be transmitted to fixed beams.

The complex weights do not need to have unit norm but may have a value differing from 1.

The previous phase-hopping concept has been converted according to the present invention to a phase-modulation concept which is applicable e.g. to the parallel channels in HDR (High Data Rate) or to any high rate transmission concept in which a number of parallel channels are used with at least two transmit antennas.

This proposed concept has the advantage that it avoids the previous time-variant phase-offset arrangements, thereby resulting in a simpler receiver implementation in the user equipment. The concept can be implemented at base band using different rotated symbol constellations in parallel channels prior signal spreading.

The performance of the concept, when combined with STTD is similar as with Trombi, when this is used in place of phase hopping.

Best symbol error rate is likely to be obtained with ABBA based/type solution with fixed phase offsets (in the presence of at least 3 antennas/channels). In that case one may be able to use a very high rate channel code, and some ARQ solution for "good enough" performance (with ARQ the phase can change if the retransmission occurs well with the channel coherence time).

With OFDM, the ABBA solution randomizes the interference across multiple antennas, and typically requires that a simple (linear or nonlinear) interference cancellation concept is used in the receiver to mitigate to non-orthogonality of the space-time code. With parallel-Trombi, it is simpler, as the codes and symbols remain orthogonal. No such CDMA based system (HDR, HSDPA) without the space-time code component even for two transmit antennas achieving the advantages described herein before is presently known to the inventors. In any case it is beneficial then to use one of the parallel channels for channel estimation and fix the phase offset for the parallel channels a priori so that the receiver of the user equipment need not estimate the channel for each of the parallel channels separately. However, if the parallel channels have independent channel estimators, the proposed concept is backward compatible to such a system. It is also possible that the transmitter can use the concept if it so desires and the receiver blindly detects this. Blind detection can be done for example by demodulating the signal using the proposed concept (fixed phase offset) and without using the proposed concept, and selecting the one that gives better performance (e.g. symbol reliabilities at the output of the decoder).

It is likely that the performance increase will be the highest in indoor channels (7-9 dB's compared to single antenna transmission).

In particular, it is to be noted that the parallelization means is adapted to achieve a multicode transmission (WCDMA, Wideband Code Divisional Multiple Access). In this case, the parallelization means uses a Hadamard transformation (Hadamard matrix) or a submatrix of a Hadamard matrix. Also, parallelization is then followed by scrambling processing prior to transmission out of the antennas. If no Hadamard matrix for parallelization is to be used, so-called Gold codes may be used instead, which alleviates tie necessity for subsequent scrambling. With scrambling, however, better autocorrelation properties for the signal can be obtained to make use of RAKE diversity.

Alternatively, the parallelization means may be adapted to perform an Inverse Fast Fourier Transformation IFFT (in connection with OFDM).

Furthermore, it is pointed out that the weighting means are adapted to perform not only a simple multiplication but a linear transformation. To this end, the weighting matrix may preferably be a matrix of the kind such that the weighting matrix W is unitary, i.e. that when multiplied with its conjugate complex transposed matrix $W^H$ yields the identity matrix I having only values of "1" in its diagonal ($W^{H*}W=I$).

Moreover, in case the pre-diversification means subject the symbol to a non-orthogonal space-time code, non-orthogonal space-time block codes such as ABBA, Randomized ABBA (RABBA), or Alamouti Code (STTD in WCDMA) are advantageously to be used.

Also, the sequence of parallelization and weighting may be reversed, provided that the used signal processing is suitably modified. The symbols prior parallel transmission can be subjected to weighting or the parallel channels (modulated spreading codes) can the subjected to weighting.

Thus, according to the present invention, the phases in (selected parallel channels) in m−1 out of m antennas are randomized by fixed complex weights so that destructive combination does not dominate. If n parallel channels are present due to parallelization, a n dimensional weighting matrix can be used, although a two-dimensional matrix could be sufficient. In an n dimensional matrix, some of the complex phases may be set to zero, in which case no weighting is imposed on that particular channel.

It is to be noted that signals as described in this application are represented in matrix notation. Thus, the symbol and/or symbol sequence is to be understood to be in matrix notation. Those matrices are for example described in "Complex Space-Time Block Codes For Four Tx Antennas", O. Tirkkonen, A. Hottinen, Globecom 2000, December 2000, San Francisco, US for orthogonal space-time codes with a different number of transmit antennas. (A single symbol would correspond to a sequence of a minimum sequence length, e.g. length one).

Also, a receiver adapted to receive the signals transmitted according to the present invention will have to be provided in particular with a corresponding despreading functionality, adapted to perform the inverse operation as compared to the transmitting side. This inverse operation can be expressed by the subjecting the received signal to an inverse processing, represented by multiplying with the inverse matrices ($H^{-1}$, $W^{-1}$). Apart therefrom, a receiver will comprise RF parts, a channel estimator, a symbol detector (e.g. based on maximum likelihood, maximum a posteriori, iterative interference cancellation principles), and multiplexer.

Accordingly, as has been described herein above, the present invention concerns a diversity transmitter, comprising: transmit symbol input means (1) for inputting a symbol matrix (b) to be forwarded to a transmit processing means (2), said transmit processing means comprising supplying means (2a) for supplying said columns of said symbol matrix to a plurality of at least two branches, each branch being supplied to a respective one of spatial channels (A1, . . . , Am) for transmissin to a receiver, a parallelization means (2b) adapted to provide within each branch at least two parallel channels allocated to a respective user, and weighting means (2c) adapted to subject the symbol matrix signals on at least one of said branches to an invertible linear transformation with a fixed complex weight, the complex weight being different for at least two parallel channels. The present invention also concerns a corresponding diversity transmission method.

Although the present invention has been described herein above with reference to its preferred embodiments, it should be understood that numerous modifications may be made thereto without departing from the spirit and scope of the invention. For example, the transmitter may be the mobile terminal, and the receiver the base station, or another mobile terminal. Furthermore, the spatial channel may include so called polarization diversity channels. Power control may be applied to the parallel channels separately or jointly. Some of the parallel channels may provide a different quality of service (e.g. BER) and have different channel coding (error correction/error detection), and/or different relative transmit powers. Some of the transmit antennas may belong to different base stations in which case the invention can be used to provide macrodiversity or soft handoff. It is intended that all such modifications fall within the scope of the appended claims.

DOCUMENTS CITED IN THE SPECIFICATION

[1] "A Randomization Technique for Non-Orthogonal Space-Time Block Codes", by A. Hottinen & O. Tirkkonen, presented on IEEE Vehicular Technology Conference, May 2001, Rhodes, Greece

[2] "New CPICH Transmission Scheme for 4-antenna transmit diversity", Samsung contribution to TSG-RAN Working Group 1 meeting #15, Berlin, Germany, Aug. 22-Aug. 25, 2000

[3] "A Space-Time Coding Concept for a Multi-Element Transmitter", by A. Hottinen, K. Kuchi, O. Tirkkonen, Canadian Workshop on Information Theory, June 2001, Vancouver, Canada

[4] "Spatial Transmit diversity techniques for broadband OFDM systems", by S. Kaiser, published in IEEE, 2000, page 1824-1828, (0-7803-6451-1/00)

[5] U.S. Pat. No. 6,157,612

[6] "Draft Baseline Text for Physical Layer Portion of the 1xEV Specification", 3GPP2 C.P9091 ver. 0.21, Aug. 24, 2000 (3GPP2 TSG-C working group III)

[7] "Complex Space-Time Block Codes For Four Tx Antennas", O. Tirkkonen, A. Hottinen, Globecom 2000, December 2000, San Francisco, US

The invention claimed is:

1. A diversity transmitter, comprising:
transmit symbol input means for inputting a symbol matrix to be forwarded to a transmit processing means;
the transmit processing means comprising
supplying means for supplying columns of the symbol matrix to a plurality of at least two branches, each branch being supplied to a respective one of spatial channels for transmission to a receiver;
a parallelization means for providing within each branch at least two parallel channels allocated to a respective user; and
weighting means for subjecting the symbol matrix signals on at least one of the branches to an invertible linear transformation with at least one fixed complex weight, the complex weight being different for at least two parallel channels.

2. A diversity transmitter according to claim 1, wherein: the invertible linear transformation is a unitary transformation.

3. A diversity transmitter according to claim 2, wherein: the unitary transformation is represented by a unitary weight matrix in which at least two elements have different non-zero complex phase values.

4. A diversity transmitter according to claim 1, wherein: the parallelization means performs multicode transmission using multiple spreading codes.

5. A diversity transmitter according to claim 4, wherein: multicode transmission is performed using a Hadamard transformation by multiplying the symbols with a spreading code matrix.

6. A diversity transmitter according to claim 4, wherein: the spreading code matrix is antenna specific.

7. A diversity transmitter according to claim 4, wherein: the spreading codes are non-orthogonal spreading codes.

8. A diversity transmitter according to claim 4, wherein: the spreading codes are orthogonal spreading codes.

9. A diversity transmitter according to claim 1, wherein: the fixed complex weights applied by the weighting means are time-invariant phase shift amounts for the respective parallel channels.

10. A diversity transmitter according to claim 9, wherein: the phase shift amounts are independent of the channels in at least two corresponding parallel channels transmitted out of different antennas.

11. A diversity transmitter according to claim 9, wherein: the phase shift amounts are dependent on the channels.

12. A diversity transmitter according to claim 9, wherein: the weighting matrix is identical for each branch.

13. A diversity transmitter according to claim 9, wherein: the weighting matrix differs for each branch.

14. A diversity transmitter according to claim 9, wherein: the phase offsets in parallel channels differ by a fixed amount.

15. A diversity transmitter according to claim 9, wherein: the phase offsets in parallel channels differ by a maximum possible amount.

16. A diversity transmitter according to claim 9, wherein: the phase offsets in parallel channels cover a full complex circle of 360.degree.

17. A diversity transmitter according to claim 9, wherein: the phase offsets in parallel channels are taken from a Phase Shift Keying configuration.

18. A diversity transmitter according to claim 9, wherein: the used phase offsets are signaled to the receiver.

19. A diversity transmitter according to claim 9, wherein: the phase offsets are at least partially controlled by the receiver via a feedback channel.

20. A diversity transmitter according to claim 1, comprising: a pre-diversification means arranged downstream the input means and upstream the transmit processing means; the pre-diversification means subjects the inputted symbol sequence to a diversification, at least one diversified symbol sequence being supplied to the processing means.

21. A diversity transmitter according to claim 20, wherein: the pre-diversification means subjects the input symbol sequence to at least one of an orthogonal transmit diversity, orthogonal space-time transmit diversity processing, a non-orthogonal space-time transmit diversity processing, delay diversity processing, Space-Time Trellis-Code processing, or Space-Time TurboCode processing.

22. A diversity transmitter according to claim 21, wherein: the pre-diversification means subjects the input symbol to more than one of the processings, the processings being performed in concatenation.

23. A diversity transmitter according to claim 1, wherein: the input symbol sequence is a channel coded sequence.

24. A diversity transmitter according to claim 23, wherein: the channel coding is Turbo coding, convolutional coding, block coding, or Trellis coding.

25. A diversity transmitter according to claim 1, wherein: all columns of the symbol matrix contain identical symbols.

26. A diversity transmitter according to claim 1, wherein: the symbol matrix is an orthogonal space-time block code.

27. A diversity transmitter according to claim 1, wherein: the symbol matrix is a non-orthogonal space-time block code.

28. A diversity transmitter according to claim 1, wherein: at least one column of the symbol matrix is different from another column.

29. A diversity transmitter according to claim 1, wherein: the symbol matrix contains at least two space-time code matrices, each modulating different symbols.

30. A diversity transmitter according to claim 1, wherein: all columns of the symbol matrix have different symbols, each parallel channel transmits from respective spatial channel in parallel at least two symbols allocated to the spatial channel.

* * * * *